US007412466B1

(12) United States Patent
Garthwaite (10) Patent No.: US 7,412,466 B1
(45) Date of Patent: Aug. 12, 2008

(54) OFFSET-BASED FORWARD ADDRESS CALCULATION IN A SLIDING-COMPACTION GARBAGE COLLECTOR

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 331 days.

(21) Appl. No.: 11/142,052

(22) Filed: May 31, 2005

(51) Int. Cl.
G06F 17/30 (2006.01)
(52) U.S. Cl. ............... 707/206; 711/133; 711/135
(58) Field of Classification Search ............... None
See application file for complete search history.

(56) References Cited

U.S. PATENT DOCUMENTS

| 4,989,134 | A | * | 1/1991 | Shaw | 707/206 |
|---|---|---|---|---|---|
| 5,561,786 | A | * | 10/1996 | Morse | 711/170 |
| 5,751,613 | A | * | 5/1998 | Doty et al. | 703/2 |
| 6,300,962 | B1 | * | 10/2001 | Wishoff et al. | 345/543 |
| 6,823,351 | B1 | * | 11/2004 | Flood et al. | 707/206 |
| 6,826,583 | B1 | * | 11/2004 | Flood et al. | 707/206 |
| 6,865,585 | B1 | * | 3/2005 | Dussud | 707/206 |
| 6,996,590 | B2 | | 2/2006 | Borman | |
| 7,016,923 | B2 | | 3/2006 | Garthwaite | |
| 7,024,436 | B2 | * | 4/2006 | Kolodner et al. | 707/206 |
| 7,031,990 | B2 | | 4/2006 | Garthwaite | |
| 7,051,056 | B2 | | 5/2006 | Rodriguez-Rivera | |
| 7,065,617 | B2 | | 6/2006 | Wang | |
| 7,069,280 | B2 | | 6/2006 | Garthwaite | |

| 2004/0078381 | A1 | * | 4/2004 | Blandy et al. | 707/101 |
|---|---|---|---|---|---|
| 2004/0128329 | A1 | * | 7/2004 | Ben-Yitzhak et al. | 707/206 |

OTHER PUBLICATIONS

Author: Martin Larose and Marc Feeley, A compacting Incremental Collector and its Performance in a Production Quality Compiler, Oct. 1998, Proceedings of the 1st international symposium on Memory management ISMM '98, vol. 34 Issue 3.*
"Garbage Collection"; Sep. 27, 2004; 7 pages; printed off website www.memorymanagement.org.
Edwards, "Artificial Intelligence Project-RLE and MIT Computation Center"; Memo 19-LISP II Garbage Collector; 2 pages, Mar. 1998.
Abuaiadh, et al; "An Efficient Parallel Heap Compaction Algorithm"; OOPSLA '04; Oct. 24-28, 2004; pp. 224-236; Vancouver, British Columbia, Canada.

(Continued)

*Primary Examiner*—Pierre M. Vital
*Assistant Examiner*—Augustine Obisesan
(74) *Attorney, Agent, or Firm*—Robert C. Kowert; Meyertons, Hood, Kivlin, Kowert & Goetzel, P.C.

(57) ABSTRACT

When calculating post-compaction destination addresses during sliding heap compaction, a block of contiguous memory objects may be treated as a single unit by adding the offset of each object in the block to the post-compaction address for the first object in the block. Additionally contiguous blocks of reachable objects may be constructed by creating deadwood objects, such as non-referenced, placeholder objects, into gaps between objects. Thus, post-compaction destination addresses for the object in the resulting contiguous block may be determined by adding the offset of an object within the block to the destination address for the first object in the block.

22 Claims, 7 Drawing Sheets

OTHER PUBLICATIONS

Agesen, et al; "An Efficient Meta-Lock for Implementing Ubiquitous Synchronization"; Sun Microsystems; Apr. 1999; pp. 1-27; SMLI TR- 99-76; Palo Alto, CA; USA.

Agesen, et al; "Mixed-mode Bytecode Execution"; Sun Microsystems; Jun. 2000; pp. 1-20; SMLI TR-2000-87; Palo Alto, CA; USA.

Agesen; "GC Points in a Threaded Environment"; Sun Microsystems; Dec. 1998; pp. 1-20; SMLI TR-98-70; Palo Alto, CA; USA.

Ben-Yitzhak, et al; "An Algorithm for Parallel Incremental Compaction"; IBM Haifa Research Laboratory, Mount Carmel; Jun. 20-21, 2002; pp. 100-105; Berlin; Germany.

Appel; "Simple Generational Garbage Collection and Fast Allocation"; Department of Computer Science-Princeton Universtiy; Mar. 1998; 16 pages; Princeton, N.J., USA.

Detlefs, et al; "Inlining of Virtual Methods"; Sun Microsystems Laboratories; 21 pages; Burlington, MA, USA, Jan. 2003.

Flood, et al; "Parallel Garbage Collection for Shared Memory Multiprocessors"; Sun Microsystems; Apr. 2001; USA.

* cited by examiner

OFFSET-BASED FORWARD ADDRESS CALCULATION IN A SLIDING-COMPACTION GARBAGE COLLECTOR

BACKGROUND OF THE INVENTION

1. Field of the Invention

This invention related to the field of memory management and more particularly to forward address calculations in sliding heap compaction.

2. Description of the Related Art

In the field of computer systems, considerable effort has been expended on the task of allocating and managing memory. In general, memory may be allocated to data objects (which may also be referred to as data structures or records) either statically or dynamically. Some computer languages may require that memory be allocated for all the variables defined in a program statically, e.g., at compile time. Such static memory allocation may make it difficult to share available memory space among multiple applications, especially for applications that are long-lived. Abiding by space limitations may be easier when the platform provides support for dynamic memory allocation, i.e., when memory space to be allocated to a given object is determined at run time.

Particularly for long-lived applications, though, allocation and reclamation of dynamic memory must be performed carefully. If the application fails to reclaim unused memory—or, worse, loses track of the address of a dynamically allocated segment of memory—its memory requirements may grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference."

A way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

Various parts and levels of a computing system can implement garbage collection. One approach is simply to provide garbage collection as part of a batch compiler's output. In this approach to garbage collection, in addition to generating code for the functionality supported by an application, the batch compiler may generate code that automatically reclaims unreachable memory space without explicit direction from a the programmer, and include it within the application's object code. Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

Another approach to garbage collection may be taken in some systems that employ "virtual machines". In such a system, a compiler or an interpreter may convert source code for an application from a high-level language to instructions called "byte code" for virtual machines that various processors can be configured to emulate. One example of a high-level language for which compilers and interpreters are available to produce such virtual-machine instructions is the Java™ programming language. (Java is a trademark or registered trademark of Sun Microsystems, Inc., in the United States and other countries.) Typically, byte-code routines are executed by a processor under control of a virtual-machine process, and the virtual machine process provides memory management functions including garbage collection. For example, a memory management component of the virtual machine process may be responsible for allocating memory dynamically as needed and reclaiming unreachable memory when possible. Various other approaches to garbage collection may be employed, including implementation of garbage collection functions in hardware.

In distinguishing reachable objects from unreachable objects, garbage collectors often have to trace references between objects—for example, some garbage collectors have to identify those reference fields of an object that have been modified, as well as the objects that are referred to in the modified fields. In order to limit the amount of analysis required for collection, a record or trace of objects whose references have been modified may be maintained.

Garbage collection schemes, such as mark-sweep and reference-counting garbage collection techniques, are generally susceptible to fragmentation, where the heap includes more and more gaps between active, live objects. As a heap becomes more fragmented, it may become more and more difficult to allocate large spans of memory. To avoid this fragmentation problem, many garbage collectors compact the heap periodically to remove some or all of the gaps between live memory objects. Compacting a heap may coalesce the gaps into a single, contiguous block of memory, thereby allowing for larger objects to be allocated.

There are a number of traditional approaches to heap compaction. For example, one is to compact all reachable object to one end of the address range of the heap. Because groups of objects are moved in address order, this technique is often referred to as sliding compaction. This approach works well even when objects differ in size. By preserving the ordering of objects in the heap, it allows for a simple, pointer-bumping allocation scheme. The primary obstacle to the use of sliding compaction on multiprocessors is that the act of sliding object must be carefully staged so that reachable objects are not overwritten before they can be moved to their final destinations.

Sliding compaction techniques generally require four separate operations on a heap during marking compaction of the heap. For example, a sliding heap compactor may first traverse the heap marking all reachable objects and then may calculate new post-compaction locations for each reachable object in the heap. Subsequently, during marking compaction, all references to objects in the heap may be updated to refer to objects' post-compaction locations. And finally, all reachable objects may be moved (or slid) to their respective post-compaction locations. Generally, in sliding compaction techniques, an object's destination in the compacted heap is calculated via individual object forwarding addresses, object-extent bitmaps, or break tables. The step of updating all references to reachable objects may require significant execution and processor time because the destination address for each object must be determined based upon the size of all reachable objects that will end up below (i.e. in lower heap addresses) than the object in question.

SUMMARY

Offset-based forward address calculation may allow a sliding heap compactor to determine an object's destination address (its post-compaction location) based upon that object's relative offset in the heap. Some sliding heap compaction techniques divide the heap into fixed-size chunks and associate metadata with each chunk. When calculating new locations, or post-compaction destination addresses, according to offset-based forward address calculation, such techniques may determine the amount of live memory locations (words that are part of reachable objects) below (with lower heap addresses than) each object. In other words, sliding compaction techniques may maintain a running total of the amount of live data and associate the total amount of live data below a chunk with that chunk. Offset-based forward address calculation may utilize the total amount of live memory locations below a chunk to allow such compaction techniques to determine objects' post-compaction addresses relative to the first chunk being compacted. The amount of live data below a chunk may be considered the post-compaction address of the first word in that chunk or the first word of the first reachable object in the chunk. Thus, according to some embodiments, a sliding compactor may, according to offset-based forward address calculation as described herein, determine the post-compaction destination for objects without performing more complicated address-calculation techniques, such as those involving object-extent bitmaps, break tables, or the like.

By determining whether a chunk is completely filled by a single contiguous block of live objects, post-compaction addresses for those objects in the chunk may be calculated by combining the offset of an object relative to the first word of the chunk to the post-compaction address of the chunk. In other words, if a chunk does not contain any gaps between objects and if the chunk is entirely filled with reachable objects, the offset of the objects from the start of the chunk may be added to the amount of live data below the chunk to determine where the objects will end up after compaction. Whether or not the chunk consists of a single, contiguous block of live objects, the offset of each object in a chunk may be recorded either in storing it in the header of the individual object or in a chunk's metadata, according to various embodiments of the present invention. In some embodiments, whether or not a chunk is entirely live (i.e. is completely filled by a single contiguous block of live, or reachable objects) may be noted or recorded in the chunk's metadata. Additionally, in some embodiments, the fact that addresses for objects in a heap may be at least word, or double word, aligned may allow the lowest order bit of the post-compaction destination address to be a flag indicating whether the chunk is entirely live. Thus, in certain embodiments, when compacting the objects in a chunk, if the lowest bit of the post-destination address for the chunk, as stored in the chunk's metadata, indicates that the chunk is entirely live, a heap compactor may assume that none of the objects within the chunk must be moved relative to each other, and thus the post-compaction destination address for each object may be calculated by added the object's offset from the start of the chunk to the post-compaction address for the chunk (after clearing the lowest order bit). Since offsets of objects in a block of contiguous live objects are used for calculating destinations addresses, if a chunk consists of a single contiguous block of live objects, there may be no need to record offset information for each object either in the object header or in the chunk's metadata, according to some embodiments.

Thus, if a sequence of objects are arranged contiguously and they are all live, or reachable, and the post-compaction destination address for the first object is known, then the post-compaction destination address for each of other objects in the sequence may be determined by adding the offset of the start of each other object from the start of the first object to the post-compaction destination address for the first object.

A heap compactor may also determine that while a chunk may have gaps at the start or end of the chunk, the objects within the chunk may still form a single, contiguous block within the chunk. If a chunk does contain a single, contiguous block of objects but also includes a gap at the start of the chunk before the first live object, the post-compaction destination address for the objects in the chunk may be calculated by adding the offset of each object from the first object in the contiguous sequence to the destination address for the start of the first reachable object in the chunk. In some embodiments, the size of the offset from the start of the chunk to the first live object may be stored in the chunk's metadata.

When determining whether a chunk includes a single, contiguous block of objects, a heap compactor may compare the range of heap addresses spanned by the reachable objects in the chunks and compare the size of that address span to the amount of live data in the chunk, according to one embodiment. If this address span or bounding range equals the total amount of live data in the chunk (as determined separately), then the chunk may contain only a single, contiguous block of live data. When objects span chunk boundaries, a heap compactor may be configured to use the starting or ending address of the chunk to limit the address span to ensure that only data within the chunk is used for determining whether the chunk includes a single contiguous block of reachable objects. Thus, a heap compactor may use the information determined, or gathered, during the marking phase to determine what objects are reachable and to determine the mount of live, or reachable, data in each chunk.

Additionally, a heap compactor may be configured to fill gaps between live objects of a chunk to create a single contiguous block of live data within the chunk. For example, a heap compactor may fill gaps with objects that are not referenced by, nor contain references to, other objects, called deadwood. After filling gaps between objects, the post-compaction address for the objects in the chunk may be calculated as described above.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1A:
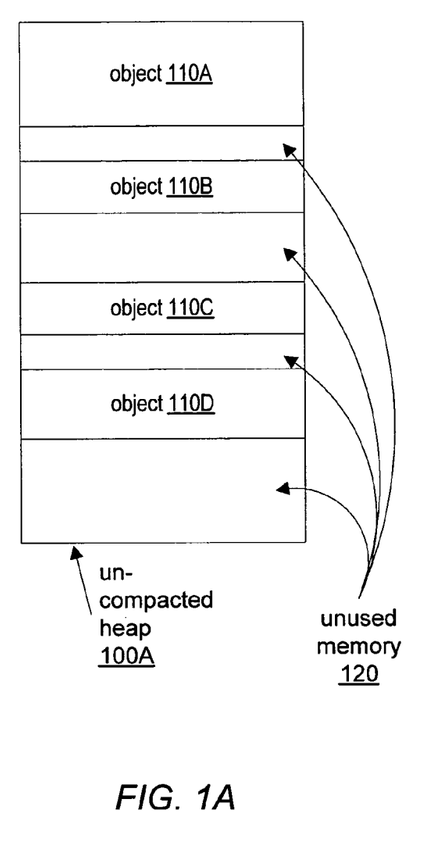
FIGS. 1A and 1B are block diagrams illustrating an exemplary heap before and after sliding compaction including offset-based forward address calculation, according to one embodiment.
Figure 1B:
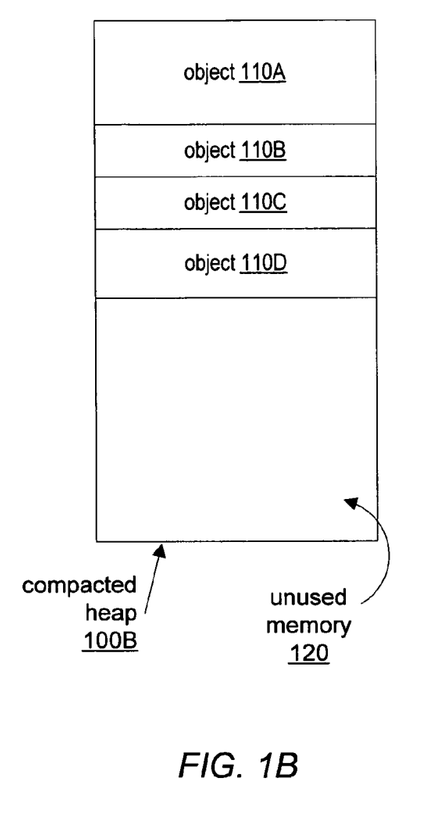

Sliding compaction with offset-based forward address calculations, as described herein, may involve compacting a memory heap of a computer system. FIGS. 1A and 1B illustrate such a heap before (FIG. 1A) and after (FIG. 1B) compaction. For example, a heap compactor may compact un-compacted heap 100A including memory objects 110A, 110B, 110C, and 110D, as illustrated in FIG. 1A. Un-compacted heap 110A may also include one more sections of unused memory 110. As noted above, a heap may become fragmented because of de-allocating or freeing memory objects no longer needed by applications or other processes of the system.

Sliding compaction techniques generally include four separate operations. During the first operation, generally called the marking phase, a heap compactor implementing sliding compaction utilizing offset-based forward address calculations may logically partition or divide un-compacted heap 100A into multiple segments or chunks of fixed, or equal, size and may determine and record per-segment or per-chunk metadata that may include such information as the total amount of live memory data in the chuck and the address, either absolute or relative to the start of the chunk, of the first live memory object in the chunk. Per-chunk metadata may also include a post-compaction destination address for the chunk, as well as other information discussed later, according to some embodiments. A post-compaction destination address for a chunk may represent the location in the heap of the first word of the chunk after compaction, in some embodiments. In other embodiments, a post-compaction destination address for a chunk may represent the post-compaction location of the first live memory location, i.e. the first word of the first reachable object, in the chunk. The heap compactor may record or save post-compaction destination addresses for chunks either temporarily in each object to be compacted or with other pre-chunk metadata. As noted above, a chunk's post-compaction destination address may be used as part of offset-based forward address calculation for determining destination addresses for individual reachable objects in the chunk, as will be discussed in more detail below.

When determining and storing per-chunk metadata, the heap compactor may trace through the heap, such as by following references to reachable objects, to determine which objects are live and/or reachable. In some embodiments, the per-chunk metadata may include the total amount of live memory data in un-compacted heap 100A below the chunk. In other words, the total size of all live objects in all chunks below (i.e. with lower heap addresses) a particular chunk may be stored as part of the metadata for the particular chunk. The per-chunk metadata may be stored in any suitable manner such that the information is accessible to the heap compactor on a per-chunk basis. In other words, the heap compactor may store the per-chunk metadata in a format allowing the metadata for a particular heap segment or chunk to be accessed and utilized individually. Please note that while sliding heap compaction with offset-based forward address calculation is described herein regarding compaction to lower addresses in a heap, a heap may also be compacted to higher address, according to various embodiments. When compacting a heap to higher heap addresses, the calculations described herein may be modified accordingly as will be apparent to those skilled in the art.

As noted above, sliding compaction may preserve the address order of all reachable objects across compaction. In other words, as illustrated in FIGS. 1A and 1B, objects 110A-110D are in the same order both before and after compaction. For example, since the ordering objects 110A-110D may be preserved across compaction, the final address for any particular object, such as object 110D, may be determined by calculating the total size of all objects below (i.e. with lower heap addresses) that object 110D. As is apparent from FIG. 1B, the address of object 110D in compacted heap 100B corresponds to the next heap address below the total size of objects 110A-C. Thus, in one embodiment, a heap compactor may be configured to use a total size of all objects below (in heap address order) an object to determine the post-compaction destination address of the object. During compaction, the heap compactor may be configured to determine the post-compaction destination address of each object in a contiguous sequence of reachable objects based upon that object's relative offset from the start of the sequence and the destination address of the first object in the sequence.

As noted above, a heap compactor may update any object references in the heap either before or while compacting the heap. When updating a reference to another object, the heap compactor may determine the destination address of the referenced object and update the reference to that object accordingly. For example, if object 110B includes a reference to object 110D, a heap compactor, when sliding object 110B, may determine the destination address of object 110D (such as according to the relative offset of that object in a contiguous block of objects, as described above) and update the reference to object 110D to point to object 110D's post-compaction destination address, even though object 110D may not have been compacted yet. Thus, any references in each of objects 110A-D may be updated on an object-by-object basis either before or as those objects are compacted.

Please note that a memory object, or objects, such as objects 110A-D, as used herein may be any block of allocated memory in a heap. In various embodiments, an object may be a JAVA programming object, a C++ programming object, or other allocated block of memory. Additionally, as noted above, the terms, "object" and "memory object" as used herein, both refer to a memory object that is accessible and allocated in a heap, and are used interchangeably herein. Also, the terms "reachable" and "live" may terms be used interchangeably herein. Please also note that, for clarity and ease of description, only a small number of chunks, objects and references are included in the examples and embodiments described herein. However, in other embodiments, a heap may include many more chunks, objects and references.

Figure 2:
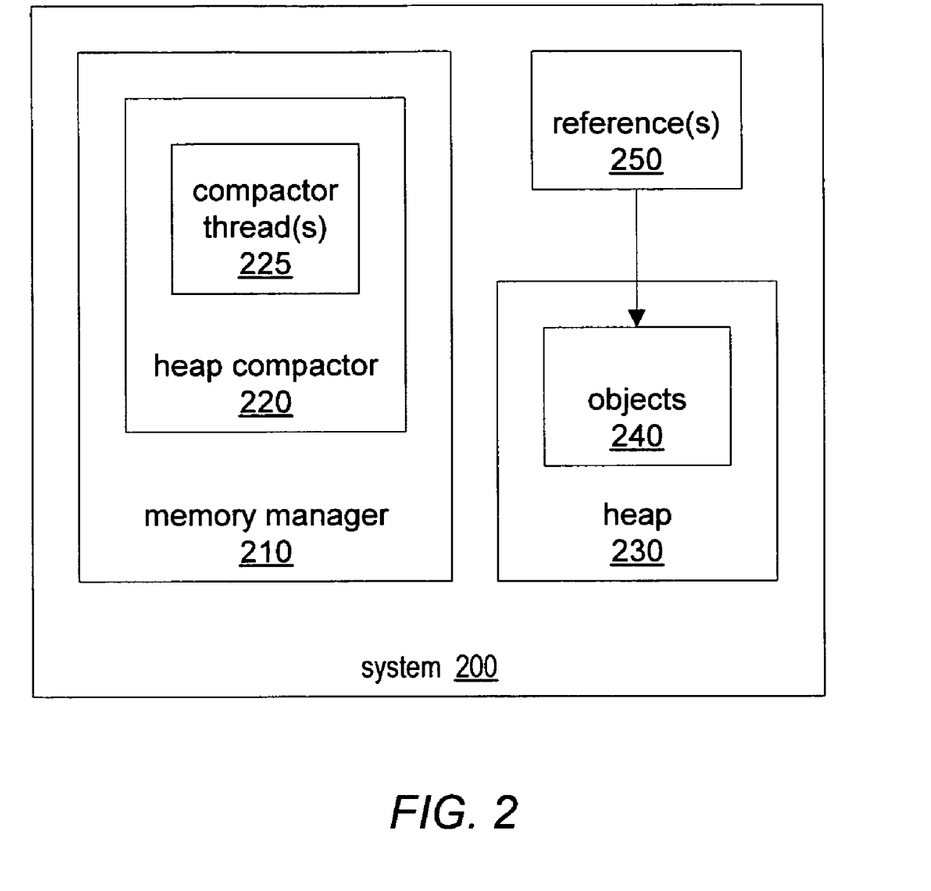
FIG. 2 is a block diagram illustrating one embodiment of a system implementing offset-based forward address calculation, as described herein.

FIG. 2 is a block diagram of a computer system capable of implementing offset-based forward address calculations as described herein. As illustrated in FIG. 2, system 200 may include a memory manager 210 configured to manage the allocation and de-allocation of memory from heap 230. As part of managing heap 230, memory manager 210 may utilize a heap compactor 220 configured to implement offset-based forward address calculations in sliding compaction, as described herein. As noted above, heap 230 may include one or more memory objects 240. Additionally, system 200 may include one or more references 250 to objects 240 in heap 230, according to some embodiments. While each of objects 240 may include one or more references to others of objects 240 in heap 230, references 250 may also reside outside of heap 230, such as in a processor cache, memory stack, call stack, and/or processor registers, according to some embodiments. Additionally, heap compactor 220 may include one or more compactor threads 225 for performing sliding compaction, including offset-based forward address calculation, in parallel, as will be discussed in more detail below. In some embodiments, system 200 may comprise one or more JAVA virtual machines and or JAVA runtime environments. In other embodiments, however, system 200 may include processes implemented in C/C++ or other languages. In general, offset-based forward address calculations in sliding compaction may be implemented in any of various computer programming languages, such as JAVA, C, C++, etc.

As noted above, during sliding heap compaction the post-compaction destination address of every reachable object may be determined and references to each object may be updated to point to an object's location after compaction. When utilizing offset-based forward address calculations, as described herein, to determine objects' post-compaction addresses, offsets between objects, or other memory locations, arranged contiguously may, in some embodiments, be added to a previously determined post-compaction destination address either for the start of chunk, the first live object, or for the first memory location in the chunk, to efficiently determine the post-compaction addresses of objects in the chunk. Additionally, in some embodiments, gaps between objects of a chunk may be filled with deadwood objects in order to create a single contiguous block of objects so that offsets between the objects may be added to the destination address for the chunk to determine post-compaction destination addresses for the object in the chunk. In some embodiments, the deadwood used to fill gaps, such as to create a single contiguous block of objects, is retained by the compaction process, thus enabling offset-based address calculation for the block of objects. Please note that the gaps between objects, as described herein, may refer to objects that are not longer reachable and thus may be considered dead or garbage during heap compaction. However, such a gap may also be an area of memory that does not currently contain any allocated object due to heap fragmentation.

Figure 3:
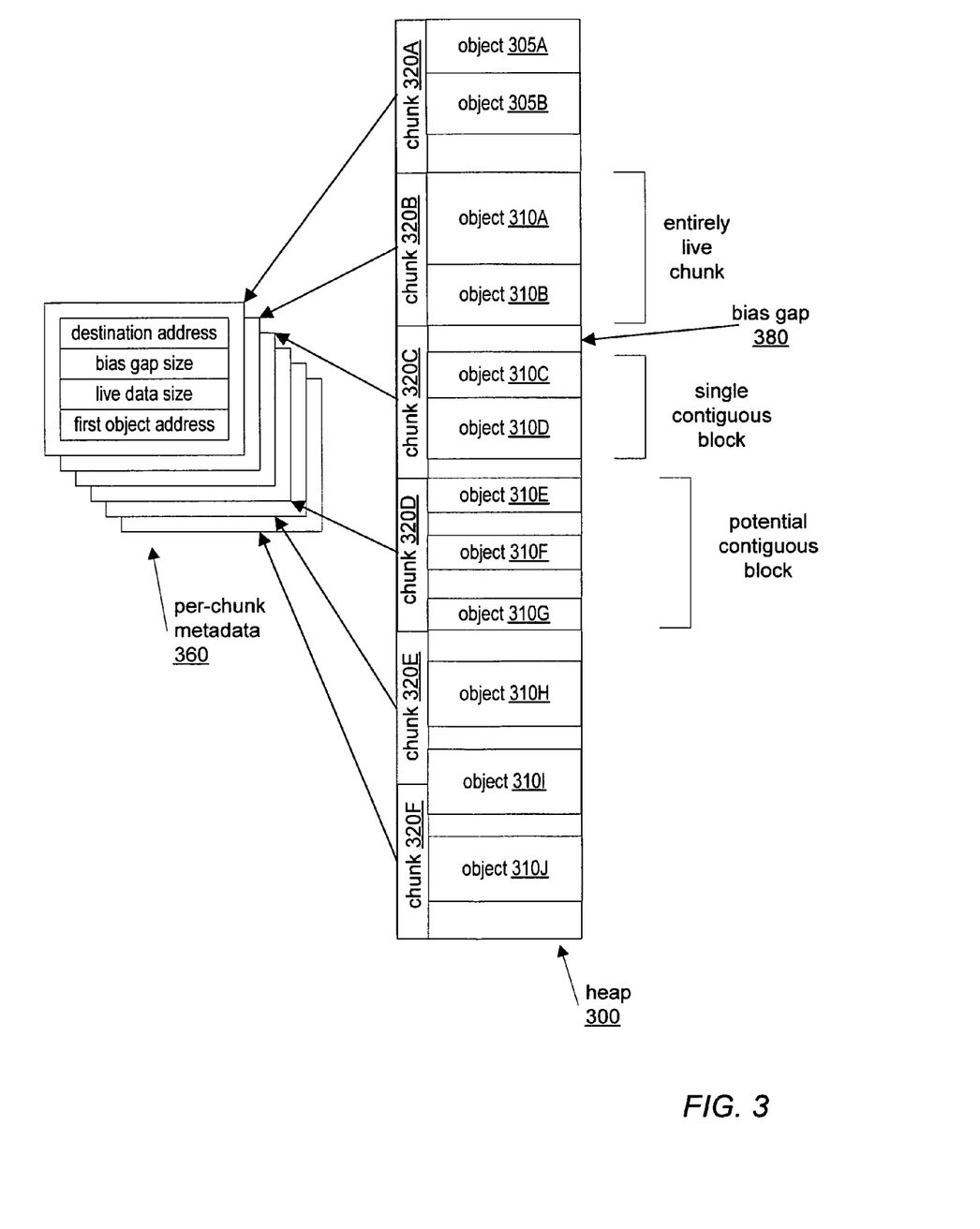
FIG. 3 is a block diagram illustrating a heap and metadata in various stages of sliding compaction including offset-based forward address calculation, according to one embodiment.

FIG. 3 is a block diagram illustrating a heap and the per-chunk metadata associated with individual chunks of the heap as part of sliding compaction using offset-based forward address calculations, according to one embodiment. As described above, heap compactor 220 may, when determining post-compaction destination addresses for reachable objects in a heap, determine whether an individual chunk of the heap contains only contiguous reachable memory and thus has no gaps, such as chunk 320B in FIG. 3. When determining whether a chunk is entirely live, heap compactor 220 may be configured to compare the amount of live data in the chunk with the actual size of the chunk, as will be discussed in more detail below. When objects span chunk boundaries, heap compactor 220 may use the chunk address boundaries instead of either or both the start of the first object and/or the end of the last object in the chunk to ensure that only live data within the chunk is analyzed. Thus, heap compactor may, in one embodiment, determine that chunk 320B is an entirely live chunk, as illustrated in FIG. 3.

In some embodiments, heap compactor 220 may be configured to record an indication that a chunk is entirely live (i.e. that the chunk includes only reachable objects arranged contiguously with no gaps) in the per-chunk metadata for the chunk. For example, in one embodiment, heap compactor 220 may be configured to modify the destination address in chunk 320B's per-chunk metadata to reflect that chunk 320B is entirely live. In some embodiments, heap compactor 220 may be configured to set (to 1) the lowest bit in the destination address as an indication that the chunk is entirely live. Please note that since, in most systems, memory objects, and thus the logical chunks, may be aligned on at least a word basis, no address may ever be odd. Hence, in some embodiments, the lowest bit in a chunk's destination address may be set (to 1) as an indication that the chunk is entirely live. In other embodiments, however, heap compactor 220 may record an indication of whether or not a chunk is entirely live is different manners, such as be using a separate, distinct datum or flag, not part of the destination address of the chunk. However, in some embodiments, using the lowest bit of a chunks destination address may be more efficient in terms of memory overhead than storing such an indication separately.

Additionally, heap compactor 220 may also determine whether a chunk that is not entirely live (i.e. containing a single contiguous block of reachable objects entirely filling the chunk) contains a single contiguous block of reachable objects. For example, a chunk may include a block of contiguous reachable objects, but a gap may exist either at the start of the chunk before the first reachable object or after the end of the last reachable object, or both. A gap of dead memory at the start of a chunk before a block of contiguous object may be referred to herein as a bias gap, such as bias gap 380 between the start of chunk 320C and the start of object 310C. In some embodiments, the size of such a bias gap may be taken into account when determining the post-compaction address for the start of the chunk or when determining the post-compaction address for the start of the first reachable object in the chunk.

When determining whether a chunk includes a single, contiguous block of reachable objects, heap compactor 220 may be configured to compare the amount of live data in the chunk, as determined previously, with the amount of heap memory between the start of the first object and the end of the last object in the chunk. For example, heap compactor 220 may, in one embodiment, compare the amount of memory between the first word of object 310C and the last word of object 310D, including any potential gaps, with the total amount of live data determined previously for chunk 320C. Thus, if there was a gap between object 310C and object 310D the amount of data between the start of object 310C and the end of 310D would be greater than the actual amount of live data for chunk 320C. In one embodiment, heap compactor 220 may analyze chunk 320D by comparing the amount of the heap spanned between the start of object 310E and the end of object 310G with the actual amount of live data in chunk 320D. As illustrated in FIG. 3, chunk 320D includes a gap between object 310E and object 310F and another gap between object 310F and object 310G. Thus, heap compactor 220 may determine that the amount of data between the start of object 310E and the end of object 310G is greater than the actual amount of live data in chunk 320D, as determined previously be traversing all reachable objects in heap 300. Thus, heap compactor 220 may determine that chunk 320D does not include a single contiguous block of reachable objects.

In situations where objects span chunk boundaries, heap compactor 220 may be configured to use one or both of the chunk's boundary addresses instead of the address of the edge of the objects when determining whether a chunk includes a single contiguous block of reachable objects. For example, since object 310I starts in chunk 320E but ends in chunk 320F, heap compactor 220 may be configured to compare the amount of data between the start of object 310H and the end of chunk 320E, rather than the end of object 310I, to the actual amount of live data in chunk 320E. Similarly, when analyzing chunk 320F, heap compactor 220 may be configured to compare the amount of data between the start of chunk 320F, rather than the start of object 310I, and the end of object 310J, with the actual amount of live data in chunk 320F. Furthermore, when analyzing a chunk in which the first object in the chunk starts in the previous chunk and the last object ends in the next chunk, heap compactor 220 may be configured to compare the amount of the heap spanned between the start and end of the chunk (i.e. the size of the chunk) and the actual amount of live data in the chunk. In any of the above comparisons, if the amount of data between the start of the first object (or the start of the chunk if the first object starts in the previous chunk) and the end of the last object (or the end of the chunk if the last object ends in the next chunk) equals the amount of live data in the chunk, the objects in the chunk may be considered arranged in a single, contiguous block. If, however, the amount of data between the start of the first object or memory location in the chunk and the end of the last object or memory location in the same chunk is greater than the amount of live data in the chunk, at least one gap exists between two of the objects. Please note that the amount of the heap spanned between the reachable objects in a chunk should never be less than the amount live data in the chunk, according to some embodiments.

Thus, the calculation used, according to some embodiments, to determine whether a chunk include a single contiguous block of objects may be expressed as:

object_span=min(max_chunk_address, end_of_last_object)−max(min_chunk_address, start_of_first_object);

where object_span refers to the amount of the heap spanned between the start of the first object in the chunk or the start of the chunk whichever is greater and the end of the last object in the chunk or the end of the chunk whichever is smaller. If object_span is equals the actual amount of live data in the chunk, the chunk includes a single, contiguous block of objects.

Please note that while the above calculations used to determine whether a chunk includes a single contiguous block of reachable objects is described in terms of compacting the heap to lower heap addresses, in some embodiments, a heap may be compacted to higher heap addresses with only minor modifications to the above calculations.

In some embodiments, heap compactor 220 may be configured to store an indication that a chunk includes a single contiguous block of objects in the chunk's per-chunk metadata, such as in per-chunk metadata 360. As noted above, in one embodiment heap compactor 220 may be configured to use the lowest bit of a chunk's destination address to indicate whether or not the chunk is entirely live. In other embodiments, however, heap compactor 220 may be configured to use the lowest bit in a chunk's destination address to indication whether the chunk includes a single, contiguous block of objects, regardless of whether that block of contiguous objects fills the entire chunk or not. Additionally, heap compactor 220 may be configured to store the size of any bias gap, such as bias gap 380 in chunk 320C, in a chunk's per-chunk metadata. The size of the bias gap may be subtracted from the destination address stored in the per-chunk data or alternatively may be stored separately in the per-chunk data for access and use subsequently, according to various embodiments. As noted above, a bias gap may refer to the offset of the start of the first reachable object in relation to the start of the chunk including that object.

According to some embodiments, heap compactor 220 may be configured to use a single calculation, such as the one described above, to determine whether a chunk includes a single, contiguous block of object and whether the block is entirely live. For example, if heap compactor 220 determines that a chunk includes a single contiguous block of objects, heap compactor may also be configured to compare the amount of memory spanned by that block of objects to the size of the chunk and thus determine whether the chunk is entirely live. In other embodiments, however, heap compactor 220 may be configured to determine whether a chunk includes a single, contiguous block of objects separately from determining whether the chunk is entirely live.

In situations where a chunk does not include a single, contiguous block of reachable objects, heap compactor 220 may be configure to create a contiguous block of reachable objects by filling gaps between objects in a chunk, according to some embodiments. For example, in some embodiments, heap compactor 220 may be configured to create deadwood objects in gaps between objects by writing an object header into the start of the gap and configuring the gap to be a dead object of equal size to the gap. For example, in one embodiment, heap compactor 220 may be configured to overwrite the first few words at the start of the gap to represent a non-reference-bearing object. Thus, heap compactor 220 may create one or more deadwood objects of appropriate size to fill gaps between objects 310E, 310F, and 310G in order to completely fill the gaps and create a single, contiguous block of reachable object in chunk 320D. In one embodiment, heap compactor 220 may configure deadwood objects as integer array objects because an integer array object may be created to match the size of any gap. Please note that such a deadwood object may not be an actual object, but instead, may simply be a placeholder object header specifying an object size appropriate for the gap being filled.

If, according to certain embodiments, heap compactor 220 creates a single, contiguous block of objects in a chunk by creating deadwood objects in gaps between objects in the chunk, heap compactor 220 may be configured to store in the chunk's per-chunk metadata an indication that the chunk now includes a single contiguous block of objects, as described above. Additionally, if by adding objects in gaps between objects in a chunk, heap compactor 220 makes the chunk entirely live, heap compactor 220 may, in some embodiments, be configured to store an indication that the chunk is entirely live in the chunk's per-chunk metadata, also as described above.

In some embodiments, the heap compactor may be configured to apply compaction policies when determining whether to create a contiguous block of reachable objects by filling gaps between the objects. For example, in one embodiment, the heap compactor may be configured to determine whether the amount of time/effort required to fill the gaps is less than the amount of time/effort saved in determining post-compaction destination address for the objects individually. Thus, heap compactor 220 may be configured to analyze a chunk to determine whether it contains a potential contiguous block of objects, as illustrated in FIG. 3. If, according to one embodiment, the heap compactor estimates that the amount of time/effort required to create a contiguous block of objects out of a potential contiguous block is close to or more that the amount of time/effort such a contiguous block would save when calculating destination addresses, the heap compactor may be configured to not fill the gaps and, instead, calculate the post-compaction destination for each reachable object individually. Alternatively, in other embodiments, the heap compactor may be configured to determine whether to create a contiguous block of objects based on the size or number of the individual gaps between the objects. In general, various methods may be used to determine whether or not to create a single contiguous block of reachable objects, according to various embodiments.

As described above, a heap compactor may be configured to update object references as part of sliding compaction using offset-based forward address calculations, as described herein. In some embodiments, the heap compactor may be configured to determine the post-compaction destination address for every object before beginning to update references in the heap. However, in other embodiments, the information necessary to determine the post-compaction destination address for every object, such as the total amount of live data below each chunk, the offset within each chunk of the first reachable object and whether or not each chunk is entirely live or contains a single contiguous block of reachable objects, and each object's post-compaction destination address may be determined only when needed.

In one embodiment, a heap compactor may update all object references before actually compacting the objects in the heap. In one embodiment, only references to the start of an object may be updated, while, in other embodiments, references to any reachable memory location may be updated, such as an internal reference to a memory location within an object. When implementing offset-based forward address calculation as described herein, a heap compactor may treat blocks of contiguous reachable objects a single unit. For example, since heap compactor 220 may have already determined and stored a post-compaction destination address for the first reachable object or memory location in each chunk based upon the amount of live data in lower chunks, as described above, heap compactor 220 may determine the post-compaction destination for objects arranged contiguously by adding the offset of an object from the start of the first reachable object or memory location in the contiguous block to the destination address for the first object or memory location, such as stored in the chunk's per-chunk metadata. In some embodiments, heap compactor 220 may be configured to update all object references serially, while in other embodiments, heap compactor 220 may utilize two or more compactor threads 225 to update object references in parallel. For instance, each compactor thread may update the object references in individual chunks and the compactor threads may coordinate, via any of various well-known thread synchronization techniques, to ensure that two compactor threads do not attempt to update the references in the same chunk. As such thread synchronization techniques are well known in the art, they will not be discussed in detail herein.

Figure 4:
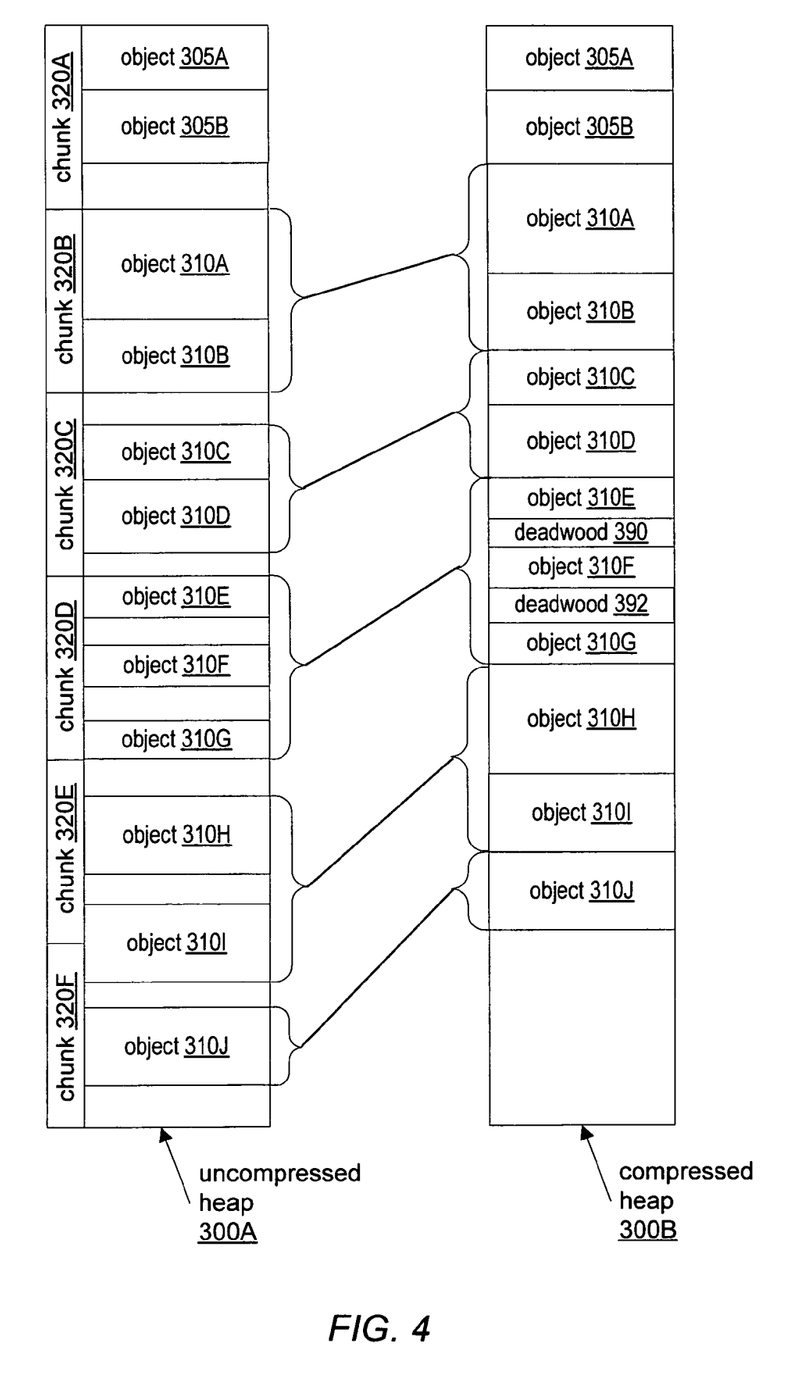
FIG. 4 is a block diagram logically illustrating offset-based forward address calculation on contiguous blocks of objects, according to one embodiment.

FIG. 4 is a block diagram illustrating the logical arrangement of a heap both before and after compaction using offset-based forward address calculations in sliding compaction, according to one embodiment. As described above, heap compactor 220 may be configured to determine post-compaction destination addresses for objects in a chunk, such as objects 310A and 310B in chunk 320B, by combining the offset of objects in relation to the first live memory location of the chunk or in relation to the start of the first live object in the chunk, according to different embodiments. For example, during the making phase of sliding compaction, heap compactor 220 may determine that chunk 320B is entirely live because objects 310A and 310B completely fill the chunk with no gaps. Thus, when sliding objects 310A and 310B during the sliding phase of sliding compaction, heap compactor 220 may determine the post-compaction destination addresses for objects 310A and 310B based upon adding the respective offset of the first word of each object to the destination address from the per-chunk metadata for chunk 320B. Thus, in compressed heap 300B object 310B is located in the same location with respect to object 310A. In other words, object 310B was compacted (or slid) to a destination determined relative to the destination of object 310A. Similarly, any references to object 310B would be updated to include the post-compaction destination address of object 310B based upon its offset from the post-compaction destination address for object 310A.

Also as noted above, heap compactor 220 may be configured to determine whether a chunk includes a single, contiguous block of objects, such as formed by objects 310C and 310D in chunk 320C. Thus, when determining post-compaction destination addresses for objects 310C and 310D, heap compactor 220 may be configured to combine the respective offset of the start of each object with the destination address in the per-chunk metadata for chunk 320C. Additionally, heap compactor 220 may be configured to create deadwoods objects 390 and 392 to fill the gaps between objects 310E, 310F and 310G, as illustrated in FIG. 4 and described above.

Figure 5:
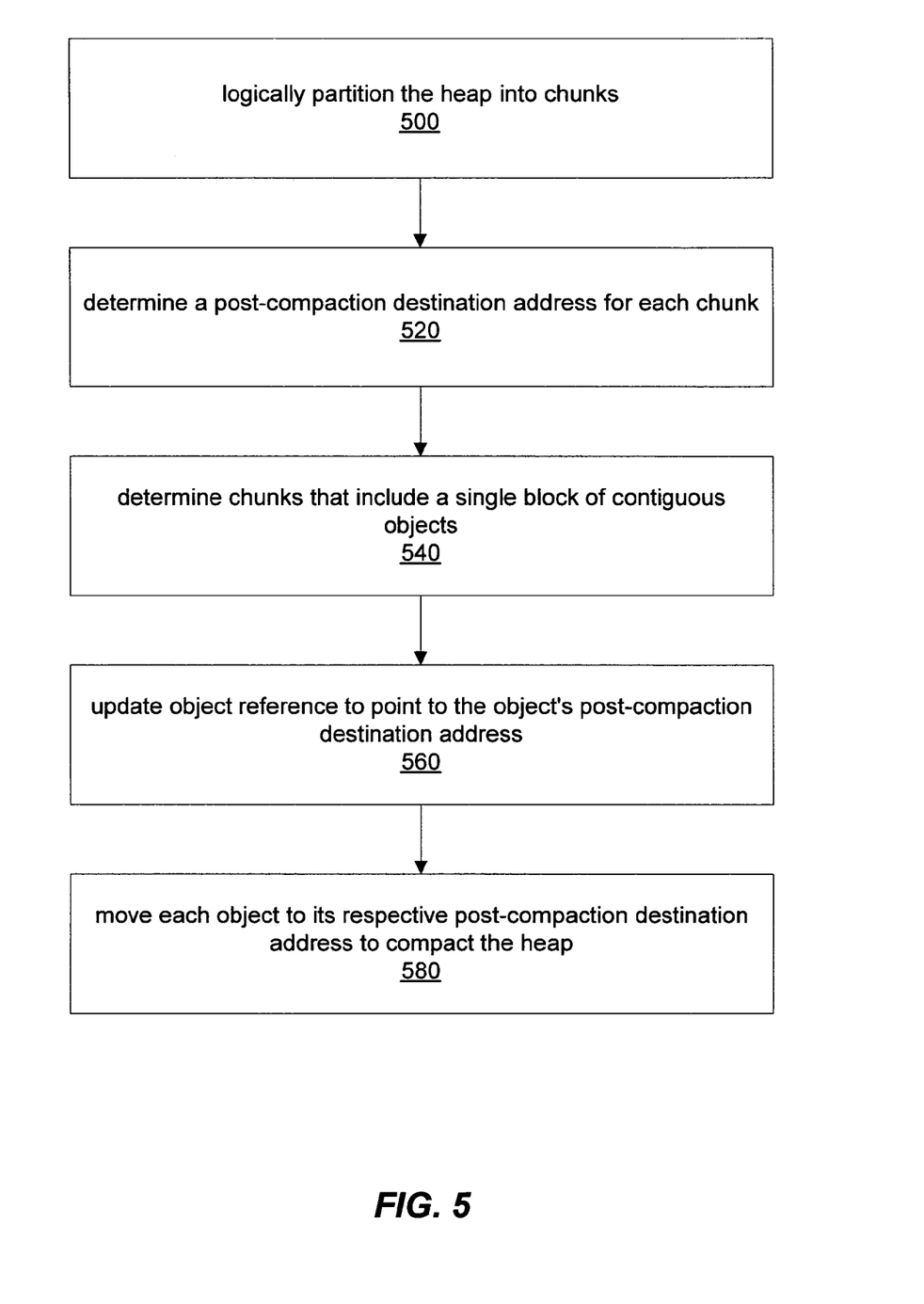
FIG. 5 is a flowchart illustrating one embodiment of a method for offset-based forward address calculations in sliding compaction garbage collection.

FIG. 5 is a flowchart illustrating one embodiment of a method for offset-based forward address calculation in sliding compaction garbage collection. As described above, references to objects in the heap must be updated to point to the referenced object's post-compaction destination address, according to some embodiments. When utilizing offset-based forward address calculations as described herein, a heap compactor, such as heap compactor 220 may first logically partition the heap into fixed size chunks, as illustrated by block 500. The actual size of each chunk may vary from embodiment to embodiment. For example, in one embodiment heap compactor 200 may divide the heap into 4K sized chunks, while in other embodiments heap compactor 200 may partition the heap into smaller (e.g., 256-byte, 512-byte, 1 KB, or 2K) chunks or larger (e.g., 8K) chunks.

After partitioning the heap into fixed sized chunks, heap compactor 220 may determine the post-compaction destination address for each chunk or for the first object in the chunk, as illustrated by block 520. In some embodiments, heap compactor 220 may add up a combined total size of all live or reachable objects in the heap lower than (i.e. located at lower addresses than) a chunk and use that total size to determine the post-compaction address or location in the heap for the chunk. For example, as illustrated in FIG. 3, discussed above, the post-compaction destination address for chunk 320B may be based upon the total size of objects 305A and 305B in chunk 320A. The post-compaction address or destination address for the chunk may, in some embodiments, represent the location in the compacted heap of the first word of the first live object in that chunk. Thus, heap compactor 220 may, in some embodiments, traverse through the heap chunk-by-chunk summing up the sizes for all live, or reachable, objects. Additionally, the amount of live data (i.e. combined size of reachable object) in each chunk may be saved in the per-chunk metadata for each chunk, as described above.

In some embodiments, multiple compactor threads 225 may perform this summing, and thus the determining of post-compaction destination addresses for each chunk, in parallel, using any of various synchronization techniques to ensure that no two threads work on the same chunk at the same time. For example, each compactor thread may claim the next available chunk in heap address order and add up the total amount of live data (i.e. the combined size of all reachable objects) in that chunk, recording the amount of live data in the chunk's per-chunk metadata.

The post-compaction destination address for each chunk may be saved or stored in per-chunk metadata for each chunk, such as in per-chunk metadata 360. In other embodiments, the post-compaction destination address for a chunk may be stored or saved in a different location or manner, however. In general, any method of recording the address may be used as part of offset-based forward address calculations, as described herein.

After a heap compactor has determined the post-compaction destination addresses for each chunk, a heap compactor performing sliding compaction may determine the post-compaction destination address for each reachable object in the heap. Alternatively, in some embodiments, post-compaction destination addresses may also be determined for memory locations within an object. When utilizing offset-based forward address compaction, a heap compactor may also determine if any chunks include a single block of contiguous objects, as illustrated by block 540. As described above, the post-compaction destination address for any object in a block of contiguous reachable objects may be determined based upon that object's offset in relation to the first object in the block, according to some embodiments. Since, sliding compaction techniques maintain the same order of objects across compaction, the ordering of the object in a contiguous block may be preserved during compaction. Thus, once a heap compactor has determined the post-compaction destination address for a chunk, as described above, the post-compaction destination address for any objects in a single, contiguous block of objects in that chunk may be determined by adding their offset relative address offset within that block to the post-compaction destination address for the chunk.

In some embodiments, heap compactor 220 may tag, mark or otherwise record an indication that a chunk includes a single contiguous block of reachable objects, as described above. For example, in one embodiment, heap compactor 220 may set the lowest order bit in the post-compaction destination address for the chunk in the chunk's per-chunk metadata. Since most, if not all, memory management systems align memory objects on at least a word boundary (i.e. no objects may start at an odd address) the lowest order bit of any valid post-compaction destination address may always be zero. Thus, in one embodiment, heap compactor 220 may utilize that fact to re-use the lowest bit of the post-compaction destination address to indicate whether or not a chunk includes a single, contiguous block of reachable objects. In other embodiments, however heap compactor 220 may record or indicate that a chunk includes a single, contiguous block of reachable objects in other ways, such as by using a separate data location or flag in the pre-chunk metadata.

As will be discussed in more detail below, a chunk may be completely filled by a single, contiguous block of reachable objects or may also include a gap, such as either unallocated memory or deallocated, or unreachable, objects, before and/or after a single block of reachable objects. When such a gap occurs before the start of a block of contiguous reachable objects, heap compactor 220 may, in one embodiment, record the size of that gap, referred to as a bias gap herein, in the chunk's per-chunk metadata. Additionally, heap compactor 220 may also be configured to create a single contiguous block of reachable objects by creating deadwood objects of suitable size to fill gaps between objects in a chunk.

As when determining the post-compaction destination addresses for each chunk, multiple compactor threads may determine and tag chunks that include a single contiguous block of reachable objects in parallel, according to some embodiments. In one embodiment, heap compactor 220 and/or multiple compactor threads 225 may determine whether a chunk include a single block of contiguous reachable objects at the same time as determining the post-compaction destination address for each chunk, even though those actions are described as separate steps herein for ease of description.

Heap compactor 220 and/or multiple compactor threads 225 may, in some embodiments, update all object references to point to the referenced object's post-compaction destination address, as indicated by block 560 and described above. Thus, heap compactor 220 and/or multiple compactor threads 225 may traverse the heap updating all references to objects. Any reference to an object that is part of a contiguous block of reachable objects may be updated by adding the offset of the object in relation to the first object or memory location in the contiguous block to the post-compaction destination address for the chunk including the block of reachable objects or memory locations, according to one embodiment. Thus, rather than determining a referenced object's post-compaction destination address individually on an object-per-object basis, such as by the use of object-extent bitmaps, break-tables or individual forwarding addresses, heap compactor 220 may, in some embodiments, utilize the object's offset to determine the post-compaction destination addresses for objects arranged contiguously.

Please note that any suitable method for traversing the heap and or object references may be utilized in conjunction with updating references according to offset-based forward address calculation, as described herein. Thus, in some embodiments, heap compactor 220 may traverse the heap updating the references in each chunk as it goes. In other embodiments, however, object references may be updated by traversing the reachable objects in a depth first recursive manner.

After updating all object references to point to the referenced object's destination address, heap compactor 220 may then compact the heap by moving each reachable object to its respective post-compaction destination address, as illustrated by block 580. In some embodiments, multiple compactor threads 225 may compact the heap in parallel by each claiming a chunk and moving the objects in that chunk to their post-compaction destinations. The exact method used to traverse the heap and move the reachable objects to their destinations may vary from embodiment to embodiment. In general, any form of sliding compaction or any form of compaction that preserves the address order of reachable objects may be used with offset-based forward address calculation, as described herein.

Figure 6:
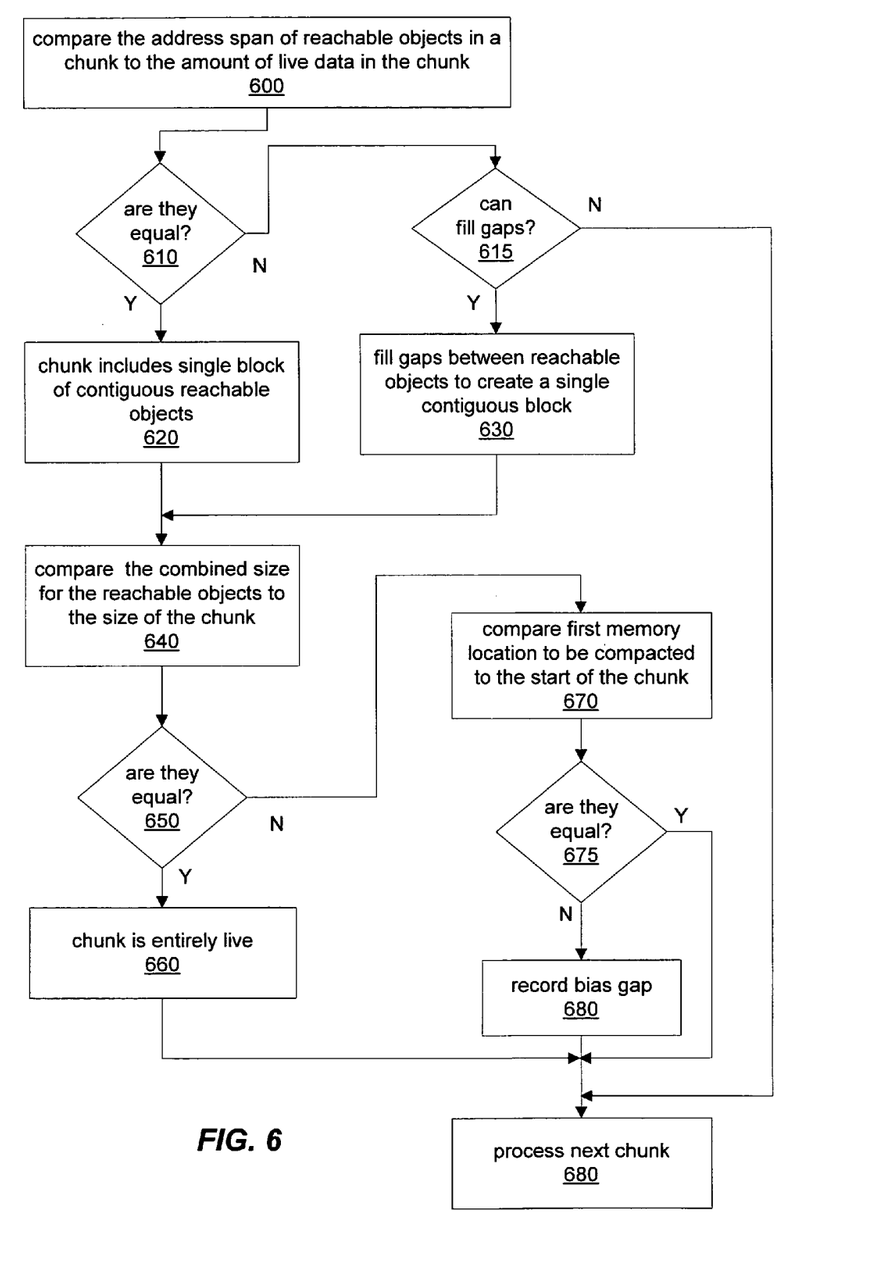
FIG. 6 is a flowchart illustrating one embodiment of a method for determining whether a chunk includes a single contiguous block of reachable objects.

FIG. 6 is a flowchart illustrating one embodiment of a method for determining whether a chunk includes a single block of contiguous reachable objects. As described above, a heap compactor, such as heap compactor 220, may traverse the heap analyzing or processing each chunk to determine whether the chunk includes a single block of contiguous reachable objects, according to some embodiments. In one embodiment, multiple compactor threads 225 may traverse the chunks in parallel. Additionally, heap compactor and/or compactor threads 225 may determine whether a chunk includes a single block of contiguous reachable objects while also determining the chunk's post-compaction destination address, according to some embodiments. When analyzing a chunk to determine whether it includes such a block of contiguous objects or memory locations, heap compactor 220 may compare the heap address span of all the reachable objects in the chunk to the amount of live data in the chunk, as illustrated by block 600.

For example, heap compactor 220 may determine the address of the start of the first object or memory location in the chunk and the address of the end of the last object or memory location in the chunk to determine the address span of the objects, according to one embodiment. Since some objects may cross over chunk boundaries, heap compactor 220 may, in some embodiments, be configured to adjust the address span accordingly. For instance, if the first object in the chunk actually starts in the previous chunk, heap compactor 220 may use the starting address of the chunk instead of the starting address of the first object when determining the address span of the reachable objects. Similarly, if the last object in the chunk actually ends in the next chunk, heap compactor 220 may, in some embodiments, be configured to use the ending address of the chunk instead of the ending address of the last object when determining the address span of the reachable objects.

The heap compactor may then compare the address span for the reachable objects, as adjusted by the size of the chunk if required, to the amount of live data in the chunk, according to some embodiments. As noted above, the amount of live data, or, in other words, the combined size of all reachable objects in a chunk, may be stored in the per-chunk metadata for each chunk, in some embodiments. Thus, heap compactor 220 may access the per-chunk metadata for the chunk in question and compare the address span to the amount of live data in the chunk. If the address span of the reachable objects equals the amount of live data in the chunk, the chunk includes a single block of contiguous reachable objects, as illustrated by blocks 610 and 620. If they do not, the chunk does not include such a block of contiguous objects.

If a chunk does not include a single block of contiguous reachable objects, heap compactor 220 may, in some embodiments, be configured to determine whether or not to fill any gaps between the reachable objects in the chunk to create a single contiguous block of reachable objects, as illustrated by blocks 615 and 630. As described above, heap compactor 220 may be configured to follow various compaction policies regarding the size and/or number of gaps when determining whether to fill the gaps to create a block of contiguous objects. Thus, in some embodiments, only if the total size or number of the gaps is below some threshold may heap compactor 220 create a contiguous block of reachable objects. In one embodiment, heap compactor 220 may fill all gaps such that a chunk is entirely filled with a single, block of contiguous objects, while, in other embodiments, heap compactor 220 may only fill those gaps required to make a single block of objects, whether or not that block completely fills the chunk.

Heap compactor 220 may also be configured to compare the combined size of all reachable objects in the block of contiguous objects to the size of the chunk to determine whether the chunk is completely filled, as illustrated by block 640. A chunk that is completely filled may also be referred to herein as being completely or entirely live because it may contain only live, or reachable objects, with no gaps. Thus, if the combined size of all reachable objects in the block of contiguous objects equals the size of the chunk, as indicated by block 650, the chunk is entirely live, as illustrated by block 660. In some embodiments, heap compactor 220 may compare the amount of live data previously recorded, such as in pre-chunk metadata 360 to the size of the chunk to determine whether the chunk is entirely live, since the amount of live data is the combined size of all reachable objects in the chunk and since the heap compactor may have already determined that the reachable objects in the chunk form a single, contiguous block.

If, as indicated by the negative output from decision block 650, the combined size for the reachable objects is not equal to the size of the chunk, heap compactor 220 may, in some embodiments, compare the first memory location to be compacted to the start of the chunk, as indicated by block 670 to determine whether the chunk contains a bias gap between the start of the chunk and the first object or memory location to be relocated. If the first memory location to be compacted is equal to the start of the chunk, as indicated by the positive output of decision block 675, the chunk does not include a bias gap. However, if as indicated by the negative output of decision block 675, the first memory location does not equal the start of the chunk, the chunk does have a bias gap and heap compactor 220 may, according to some embodiments, record the size of the bias gap in the chunk's metadata, as illustrated by block 680. In other embodiments, however, the bias gap size may be subtracted from the destination address stored in the per-chunk metadata, as described above.

As illustrated by block 690, heap compactor 220 may then proceed to process the next chunk in the heap, regardless of whether the last chunk was completely live or not. Please note that the various steps and processes described above as part of the method for determining whether a chunk includes a single contiguous block of reachable objects may be performed in different orders and such a method may include additional or fewer steps, according to various embodiments.

Figure 7:
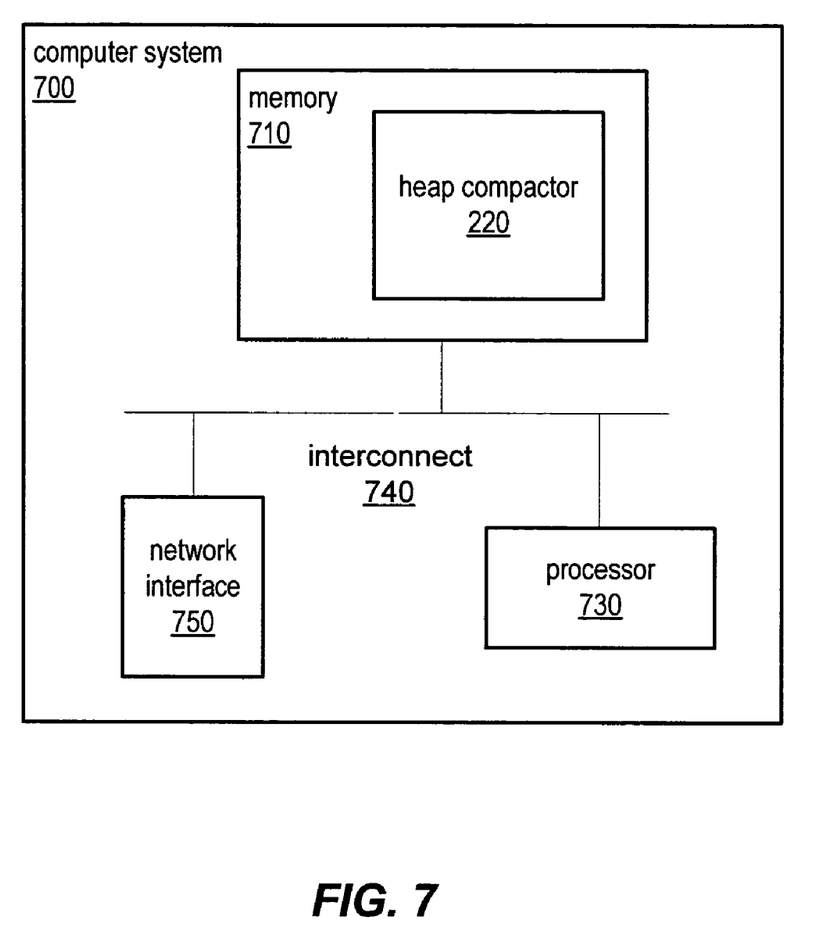
FIG. 7 is a block diagram illustrating an exemplary computer system capable of implementing offset-based forward address calculations, according to one embodiment.

FIG. 7 illustrates a computing system capable of implementing offset-based forward address calculations, as described herein and according to various embodiments. Computer system 700 and system 200, described above, may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device configured to manage memory in a heap.

Computer system 700 may include at least one processor 730. Processor 730 may couple across interconnect 740 to memory 710. Memory 710 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 710 may include program instructions configured to implement offset-based forward address calculations as described herein. In certain embodiments memory 710 may include program instructions configured to implement a heap compactor, such as heap compactor 220. In such embodiments, system heap compactor 220 may include program instructions configured to implement offset-based forward address calculations as described herein. A heap compactor may be implemented in any of various programming languages or methods. For example, in one embodiment, heap compactor 220 may be JAVA based, while in another embodiments, heap compactor 220 may be written using the C or C++ programming languages. In additional heap compactor 220 may, in some embodiment, comprise two or more compactor threads 225 configured to perform various aspects of offset-based forward calculations in parallel, as described herein.

Although the embodiments above have been described in detail, numerous variations and modifications will become apparent once the above disclosure is fully appreciated. It is intended that the following claims be interpreted to embrace all such variations and modifications.

What is claimed is:

1. A method for compacting a computer memory heap, comprising:
   logically partitioning the heap into a plurality of chunks, wherein the heap comprises a plurality of reachable objects, and wherein each of the reachable objects has a starting address within an associated one of the plurality of chunks;
   wherein each of the reachable objects comprises one or more reachable memory locations;
   identifying, between a start of a particular one of the plurality of chunks and a start of one of the reachable memory locations within that chunk, one or more gaps comprising one or more unreachable memory locations; and
   determining, for each of two or more of the reachable memory locations within the particular one of the plurality of chunks, a post-compaction destination address, wherein each said post-compaction destination address is determined according to a post-compaction destination address for the particular one of the plurality of chunks, according to an offset corresponding to the respective reachable memory location's location in the heap relative to a start of the particular one of the plurality of chunks, and accounting for the one or more identified gaps, wherein the post-compaction destination address for the particular one of the plurality of chunks is dependent on a total size of one or more reachable memory locations located at heap address closer to the direction of compaction that the start of the particular one of the plurality of chunks.

2. The method of claim 1, wherein the post-compaction destination address for the particular one of the plurality of chunks corresponds to a total size of one or more reachable memory locations located at lower heap addresses than the start of the associated chunk.

3. The method of claim 1, further comprising saving the post-compaction destination address for the particular one of the plurality of chunks in per-chuck metadata for the particular one of the plurality of chunks.

4. The method of claim 1, further comprising updating one or more references to at least one of the two or more reachable memory locations, wherein said updating comprises combining the respective reachable memory location's offset with the post-compaction destination address for the particular one of the plurality of chunks.

5. The method of claim 1, further comprising creating one or more deadwood objects in at least one of the identified gaps to create a contiguous sequence of reachable memory.

6. The method of claim 1, further comprising determining that a total size of an amount of the heap spanned by two or more reachable memory locations within an associated chunk is equal to a total combined size of the two or more reachable memory locations to determine that the associated chunk comprises a single block of contiguous reachable memory locations.

7. The method of claim 6, further comprising saving an indication that the associated chunk comprises the single block of contiguous reachable memory locations.

8. The method of claim 7, wherein said saving comprises setting a lowest bit of the post-compaction destination address for the associated chunk.

9. The method of claim 1, further comprising, determining that a total amount of reachable memory in a different one of the plurality of chunks is equal to a total size of that chunk to determine that that chunk is entirely filled by reachable memory.

10. The method of claim 1, wherein said identifying comprises identifying a gap between the start of the particular one of the plurality of chunks and a start of an initial contiguous sequence of reachable memory in the particular one of the plurality of chunks.

11. The method of claim 10, further comprising adjusting the post-compaction destination address for one of the reachable memory locations according to a size of the identified gap.

12. The method of claim 1, wherein at least one of the two or more reachable memory locations is a starting location of a respective one of the reachable objects.

13. A device, comprising:
   a processor; and
   a memory coupled to the processor, wherein the memory comprises program instructions executable by the processor to:
   logically partitioning the heap into a plurality of chunks, wherein the heap comprises a plurality of reachable objects, and wherein each of the reachable objects has a starting address within an associated one of the plurality of chunks;
   wherein each of the reachable objects comprises one or more reachable memory locations;
   identifying, between a start of a particular one of the plurality of chunks and a start of one of the reachable memory locations within that chunk, one or more gaps comprising one or more unreachable memory locations; and
   determining, for each of two or more of the reachable memory locations within the particular one of the plurality of chunks, a post-compaction destination address, wherein each said post-compaction destination address is determined according to a post-compaction destination address for the particular one of the plurality of chunks, according to an offset corresponding to the respective reachable memory location's location in the heap relative to a start of the particular one of the plurality of chunks, and accounting for the one or more identified gaps, wherein the post-compaction destination address for the particular one of the plurality of chunks is dependent on a total size of one or more reachable memory locations located at heap address closer to the direction of compaction that the start of the particular one of the plurality of chunks.

14. The device of claim 13, wherein the post-compaction destination address for the particular one of the plurality of chunks corresponds to a total size of one or more reachable memory locations located at lower heap addresses than the start of the associated chunk.

15. The device of claim 13, wherein the program instructions are further executable by the processor to: save the post-compaction destination address for the particular one of the plurality of chunks in per-chuck metadata for the particular one of the plurality of chunks.

16. The device of claim 13, wherein the program instructions are further executable by the processor to update one or more references to at least one of the two or more reachable memory locations, wherein said updating comprises combining the respective reachable memory location's offset with the post-compaction destination address for the particular one of the plurality of chunks.

17. The device of claim 13, wherein the program instructions are further executable by the processor to:
create one or more deadwood objects in at least one of the identified gaps to create a contiguous sequence of reachable memory.

18. The device of claim 13, wherein the program instructions are further executable by the processor to:
determine that a total size of an amount of the heap spanned by two or more reachable memory locations within an associated chunk is equal to a total combined size of the two or more reachable memory locations to determine that the associated chunk comprises a single block of contiguous reachable memory locations.

19. The device of claim 18, wherein the program instructions are further executable by the processor to save an indication that the associated chunk comprises the single block of contiguous reachable memory locations.

20. The device of claim 19, wherein as part of said saving the program instructions are further executable to set a lowest bit of the post-compaction destination address for the associated chunk.

21. The device of claim 13, wherein the program instructions are further executable by the processor to determine that a total amount of reachable memory in a different one of the plurality of chunks is equal to a total size of that chunk to determine that that chunk is entirely filled by reachable memory.

22. A computer-readable, storage medium, comprising program instructions computer-executable to implement;
logically partitioning the heap into a plurality of chunks, wherein the heap comprises a plurality of reachable objects, and wherein each of the reachable objects has a starting address within an associated one of the plurality of chunks;
wherein each of the reachable objects comprises one or more reachable memory locations;
identifying, between a start of a particular one of the plurality of chunks and a start of one of the reachable memory locations within that chunk, one or more gaps comprising one or more unreachable memory locations; and
determining, for each of two or more of the reachable memory locations within the particular one of the plurality of chunks, a post-compaction destination address, wherein each said post-compaction destination address is determined according to a post-compaction destination address for the particular one of the plurality of chunks, according to an offset corresponding to the respective reachable memory location's location in the heap relative to a start of the particular one of the plurality of chunks, and accounting for the one or more identified gaps, wherein the post-compaction destination address for the particular one of the plurality of chunks is dependent on a total size of one or more reachable memory locations located at heap address closer to the direction of compaction that the start of the particular one of the plurality of chunks.

* * * * *